United States Patent [19]
Winkler et al.

[11] 3,757,436
[45] Sept. 11, 1973

[54] APPARATUS PROVIDED WITH LASTING TABS AND METHOD OF LASTING

[75] Inventors: Julius G. Winkler, Lexington; Pasquale Corazzini, Watertown, both of Mass.

[73] Assignee: Compo Industries, Inc., Waltham, Mass.

[22] Filed: Dec. 4, 1972

[21] Appl. No.: 311,771

[52] U.S. Cl. ................................ 36/46.5, 12/145
[51] Int. Cl. ...................... A43b 23/00, A43d 21/00
[58] Field of Search ................. 36/46.5; 12/145, 12/142 R

[56] References Cited
UNITED STATES PATENTS

| | | | |
|---|---|---|---|
| 313,301 | 3/1885 | Cross | 36/46.5 |
| 2,984,918 | 5/1961 | Glassman | 12/145 |
| 3,249,955 | 5/1966 | Bourassa et al | 12/145 |
| 3,315,288 | 4/1967 | Forma | 12/145 |
| 3,704,474 | 12/1972 | Winkler | 12/145 |

Primary Examiner—Patrick D. Lawson
Attorney—G. Eugene Dacey

[57] ABSTRACT

A method of string lasting a shoe upper and providing an upper with a lasting string at its lower edge by means of which the lower edge is adapted to be drawn inwardly against the bottom of a last or form preparatory to injection molding of an outsole thereto and with lasting extensions at the lower edge, one at each side in the region of the shank for drawing the upper at the shank inwardly across the bottom of the last or form to conform the upper to the last or form at the shank.

13 Claims, 13 Drawing Figures

PATENTED SEP 11 1973 3,757,436

3,757,436

APPARATUS PROVIDED WITH LASTING TABS AND METHOD OF LASTING

BACKGROUND OF THE INVENTION

String lasting of uppers to a last or form preparatory to injection molding of a bottom thereto is well known. The construction of the string conforms the upper at the toe and heel to the curvature in these regions; however, at the shank the upper bridges from the ball to the heel because of the reverse curvature in the region of the shank and so it has been customary to provide means for pulling the upper inwardly at both sides of the shank to supplement the string. In some instances this has been accomplished by fixing sharp pins in the bottom of the last so that the operator may pull the lasting margin inwardly and engage the inwardly pulled edges on these pins. Such pins do not adapt themselves to a shoe construction in which an insole is employed since they would have to project upwardly through the insole and this would made it more difficult to remove the finished shoe from the form. The insole could, of course, have appropriate cut-outs such as scallops to allow for the use of pins but this would allow the soleing compound to show on the inside of the sole which is not desirable. It has also been proposed to draw the edges of the upper together at the shank by looping a string about the lasting string across the bottom at the shank, pulling it tight and knotting it. This requires an additional operation which is wasteful of the operator's time. It is the purpose of this invention to provide means at the shank of the upper for drawing it inwardly across the bottom to conform the upper at the shank to the form or last which does not require modifying the last or form itself and does not require the use of a string for tieing the lasting string at opposite sides of the margin to each other, the means being adapted to be attached to the upper in the stitching room and ready for use by the operator without requiring any additional operation on his part to assemble it to the upper.

SUMMARY

A shoe upper ready for lasting comprising a draw string at the lower edge of the upper by means of which the lasting margin is adapted to be constricted to overlie the bottom of a last or form at the forepart and heel ends and side lasting extensions fastened to the lower edge of the upper at the shank, said extensions being adapted to be pulled inwardly over the bottom at the shank in overlapping relation to cause the upper at the shank to conform to the shank and to be secured to each other in said overlapping relation. The extensions are in the form of narrow elongate strips of flexible material, to the inner sides of which adhesive is applied and may comprise leather or fabric. One of the extensions may contain longitudinally spaced slots intermediate its edges for receiving a shank reinforcing element. The extensions may be secured to each other in overlapping relation across the naked bottom of a last or form or may be secured to each other in overlapping relation to an insole at the bottom of the last or form. The aforesaid upper is draped over the last whereupon the lasting string is pulled tight to constrict the lasting margin about the forepart and heel ends and is tied. The extensions at the lasting margin in the region of the shank are then pulled inwardly at the shank into overlapping relation and adhesively secured to each other so as to conform the upper at the shank tightly to the last. The upper thus lasted is now ready for the bottom-forming operation which is carried out by holding the lasted upper against the open side of a mold and injecting a bottom-forming composition into the mold cavity against the bottom.

The invention will now be described in greater detail with reference to the accompanying drawings wherein.

Figure 1:
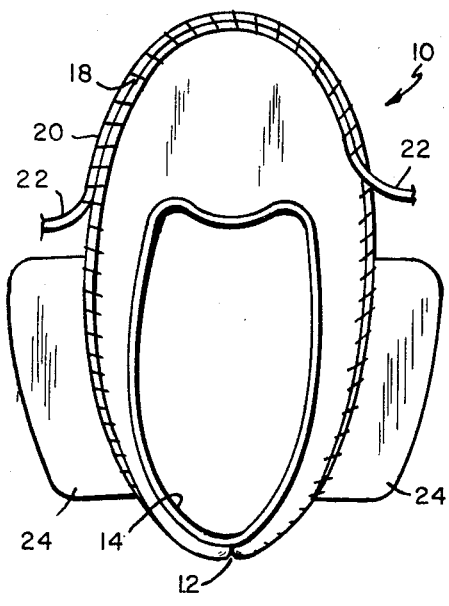
FIG. 1 is a plan view of an upper as seen from the top side, closed at its heel end and provided with a draw string at its lower edge and lasting extensions at the shank.
Figure 2:
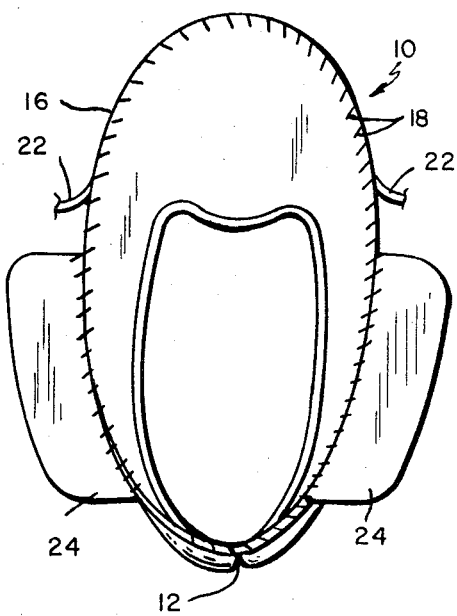
FIG. 2 is a view from the bottom side of the upper shown in FIG. 1, showing the lasting strings and the adhesively coated side of the lasting extensions at the shank.

Referring to the drawings (FIGS. 1 and 2) there is shown an upper 10 comprised of leather, vinyl, fabric or vinyl-coated fabric closed at its rear end by means of a seam 12 and having an open top 14 and an open bottom 16. Along the lower edge of the open bottom there is attached in conventional fashion by means of overedge stitching 18 a lasting string 20 with its ends 22—22 terminating at opposite sides near the rear end of the vamp portion of the upper.

Figure 7:
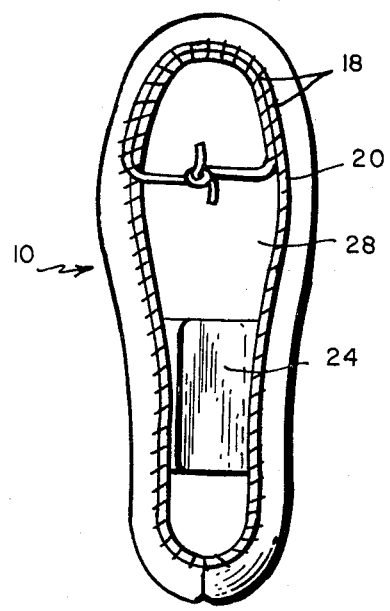
FIG. 7 is a bottom view of the upper on the last or form with the forepart and heel end lasted inwardly by means of the lasting string and the shank lasted inwardly by means of the lasting extensions.

The lasting string 20 in accordance with conventional practice is adapted to be drawn tight by pulling on the ends 22—22 to constrict the lower edge of the upper inwardly over the bottom of a last or form and to be tied to each other to hold the margin in place as shown in FIG. 7.

For convenience hereinafter in describing the invention the term "last" will be used to mean a form suitable for use in injection molding processes which must withstand heat and may be constructed of metal, plastic or wood.

Figure 3:
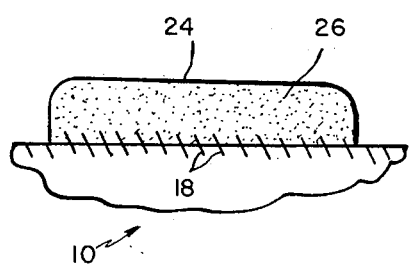
FIG. 3 is a fragmentary elevation of the inner side of one of the lasting extensions showing the adhesive coating.

At the shank the contour of the last is concave and so pulling the lasting string tight to conform the toe and heel portions to the ball and heel of the last forms bridges at the shank so that unless other measures are taken for pulling the upper in the region of the shank inwardly toward each other the upper at the shank would be loose. Previously such constriction has been accomplished, for example, by fixing sharp pins to the bottom of the last and then pulling the upper at the shank inwardly and engaging the string or the edges of the upper on these pins or by tieing a string between the portions of the lasting string at opposite sides of the last in the region of the shank to hold the upper constricted in this region. According to this invention means in the form of lasting extensions 24—24 are attached to the lower edge of the upper, for example, in the stitching room either before or during the string sewing, the means shown herein being in the form of elongate narrow strips of light leather or fabric attached by the cross-stitching 18 to the edge and having on its inner side a coating of pressure-sensitive adhesive 26 (FIG. 3). These strips extend lengthwise throughout the region of the shank and are of no greater width than the transverse width of the last at the shank.

Figure 5:
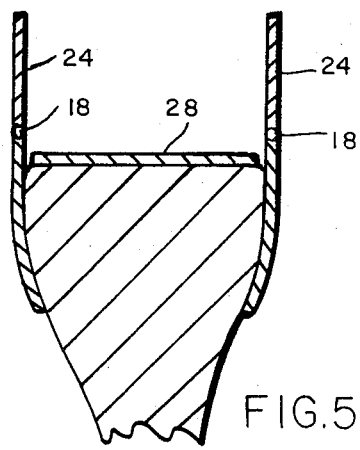
FIG. 5 shows the upper mounted on a last or form with the lasting margin and extensions extending above the bottom of the last or form.
Figure 4:
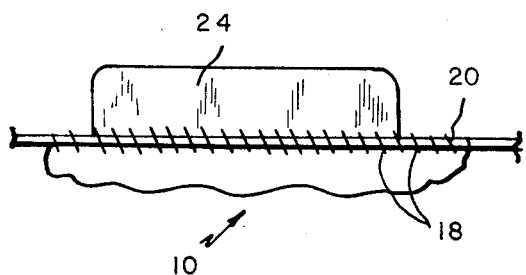
FIG. 4 is a fragmentary view of the outer side of one of the lasting extensions.
Figure 6:
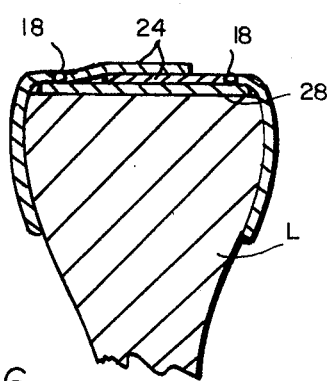
FIG. 6 is a section showing the lasting margin and extensions drawn inwardly over the bottom of the last or form.
Figure 12:
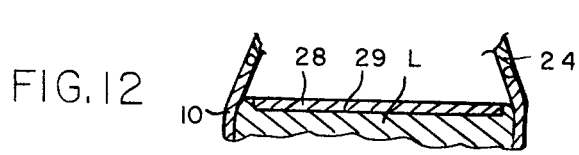
FIG. 12 is a section through a last provided with a recess for receiving the insole.
Figure 13:
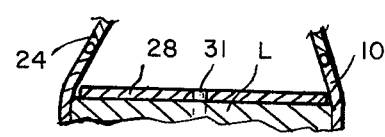
FIG. 13 is a section through a last provided with a pin at the bottom for holding the insole in place.

An upper provided with these lasting extensions 24—24 is shown mounted on a last in FIG. 5 with the margins of the upper and extensions extending upwardly from the bottom of the last. FIG. 6 shows the upper pulled inwardly over the bottom of the last and secured with the extensions in overlapping relation to each other. In this figure an insole 28 is employed. It is necessary to temporarily hold the insole on the bottom of the last at least until the lasting string is pulled sufficiently to constrict the lasting margin inwardly about the toe. This may be provided for by employing a last with a rim about the bottom (FIG. 12) defining a recess 29 for receiving the insole such as shown in pending U.S. Pat. application Ser. No. 191,317, filed Oct. 21, 1971 or by a pin 31 (FIG. 13) fixed to the bottom of the last at the toe area onto which the insole may be impaled. Alternatively, the operator may first loosely place the upper over the last, pull the lasting string sufficiently to partially pull the lasting margin inwardly over the bottom and then thrust the insole between the loosely overpulled margin at the bottom of the last. Having temporarily secured the insole to the last as suggested the operator places the upper on the last, pulls the lasting string tight, tieing it to conform the toe and heel ends to the last and then successively grasps one lasting extension 24, pulls it inwardly over the bottom and secures it to the insole and then the other inwardly over the first lasting extension and adhesively secured it thereto.

FIG. 7 shows the completely lasted upper with the lasting string constricted and tied and with the lasting extensions drawn across the bottom and secured in overlapping relation.

Figure 8:
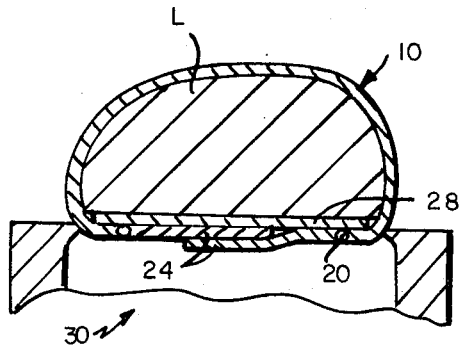
FIG. 8 is a section taken through the lasted upper supported at the open top of an injection mold assembly for molding of an outsole thereto, this section showing an insole.

The lasted upper, as shown in FIG. 7, is then placed against the top of an injection mold assembly 30, as shown in FIG. 8, whereupon a bottom-forming composition is injected into the mold against the bottom of the last upper to form an outsole to be united with the upper.

Figure 9:
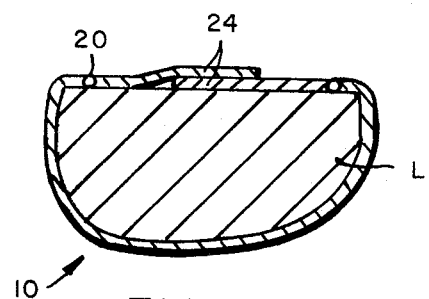
FIG. 9 is a section showing the upper lasted to the naked bottom of a last or form without an insole.

The upper may, of course, be lasted without the use of an insole, as shown in FIG. 9, although this form of construction has the disadvantage that the lasting string is exposed at the inner side of the shoe. When an insole is not employed the upper is applied to the last by drawing the lasting string tight and tieing it and then in succession pulling one of the lasting extensions inwardly and adhesively securing it to the naked bottom of the last and then drawing the other one inwardly and adhesively securing it to the upper side of the first lasting means. The adhesive employed is tacky enough to hold the first lasting extension down until the second lasting extension is secured to its upper side but does not hold to the metal of the last with any such tenacity as would make it difficult to remove the last from the shoe when the shoe is completed.

Figure 10:
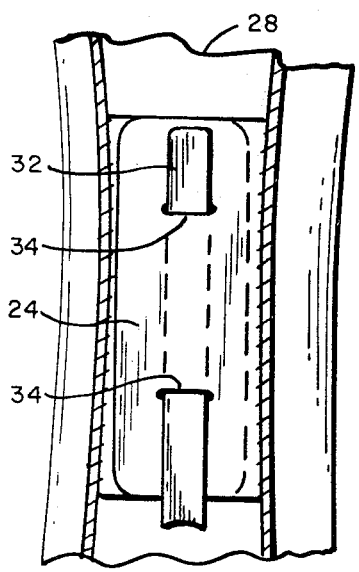
FIG. 10 is a fragmentary bottom view showing one of the lasting extensions provided with slots for receiving a shank reinforcing element.

This structure is adapted to include a shank stiffening element 32, as shown, for example, in FIG. 10. This is accomplished by making longitudinally spaced slits 34—34 in one of the extensions 24 and slipping a shank stiffener 32 through the spaced slits.

Figure 11:
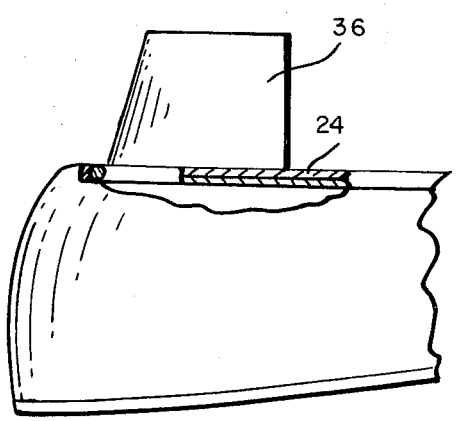
FIG. 11 is a fragmentary elevation showing a heel core attached to the lasting extensions.

Additionally, as shown in FIG. 11, the overlapping portions of the extensions provide means to which a heel core insert 36 may be adhesively attached, the core being provided with an adhesive on its upper side so that when pressed against the overlapping extensions will become attached thereto with sufficient tenacity to resist displacement during the injection molding of the outsole and heel.

It should be understood that the present disclosure is for the purpose of illustration only and that this invention includes all modifications and equivalents which fall within the scope of the appended claims.

We claim:

1. A shoe upper ready for lasting comprising a draw string at the lower edge of the upper by means of which the lasting margin is adapted to be constricted to overlie the bottom of the last at the forepart and heel ends and side lasting extensions fastened to the lower edge of the upper at the shank, said extensions being adapted to be pulled inwardly over the bottom at the shank in overlapping relation to cause the upper at the shank to conform to the shank and to be secured to each other in said overlapping relation.

2. A shoe upper ready for lasting, said shoe upper being closed at the heel end and having an open top and open bottom, a lasting string at the bottom edge by means of which the lasting margin at the bottom is adapted to be constricted to overlie the bottom of the last at the forepart and heel ends, and elongate extensions attached, one at each side of the upper, to the lower edge at the shank, said extensions being adapted to be drawn inwardly toward each other into overlapping relation across the shank and to be secured to each other.

3. A shoe upper according to claim 1, having an adhesive on the inner sides of the extensions by means of which the extensions may be secured to each other.

4. A shoe upper according to claim 1, wherein the extensions are narrow elongate strips of flexible material corresponding substantially in length to the length of the shank, said strips being narrower than the transverse width of the shank.

5. A shoe upper according to claim 4, wherein one of the extensions contains longitudinally spaced slots intermediate its edges for receiving a shank reinforcing element.

6. The method of conforming a shoe upper to a last preparatory to molding of an outsole thereto comprising providing a circular upper closed at its heel end and having top and bottom openings, attaching a continuous draw string to the edge of the upper around the bottom opening, attaching lasting extensions to said edge in the region of the shank, one at each side, mounting the upper on a last, drawing the string so as to constrict the margin at the toe and heel ends about the toe and heel ends of the last, tieing the ends of the string to hold the lasting margin constricted, grasping a lasting extension at one side, pulling it inwardly against the bottom of the last so as to conform the upper to the last at that side, grasping the lasting extension at the other side, pulling it inwardly over the lasting extension at the other side and adhesively securing it thereto so as to conform the upper to the last at the other side.

7. A method according to claim 6, comprising mounting an insole on the bottom of the last so as to be temporarily held in place while drawing the lasting margin inwardly against the bottom.

8. A method according to claim 6, comprising providing a last with a peripheral rim at its bottom defining a recess at the bottom of a configuration to receive an insole and placing the insole in said recess prior to mounting the upper on the last.

9. A method according to claim 8, comprising partially drawing the lasting margin inwardly over the bottom and then thrusting the insole between the partially lasted margin and the bottom of the last.

10. A method according to claim 6, comprising providing a last with a pin fixed to the bottom and mounting the insole on the bottom over the pin.

11. A method according to claim 6, comprising forming longitudinally spaced slits in one of the extensions and inserting a shank stiffener through said slits.

12. A method of conforming a shoe upper to a last prior to molding of an outsole thereto comprising providing a circular upper closed at its heel end, open at the top and bottom and provided with a lasting string around the bottom opening, attaching to the edge of the bottom opening in the region of the shank at each side an extension of flexible material of lesser width than the breadth of the shank, mounting the upper on the last and drawing it taut thereon by means of the lasting string, and thereafter pulling the extensions from opposite sides inwardly into overlapping engagement with each other and securing them to each other.

13. A method according to claim 12, comprising supporting the lasted bottom at the open top of a mold and forming a bottom thereto by molding of a bottom-forming composition in the mold against the bottom.

* * * * *